(12) United States Patent
Sundaram et al.

(10) Patent No.: US 9,231,866 B2
(45) Date of Patent: Jan. 5, 2016

(54) SYSTEMS AND METHODS FOR ROUTING INFORMATION IN AN INFORMATION HANDLING SYSTEM USING EXTENDED L3 LOOKUP TABLES

(71) Applicant: DELL PRODUCTS L.P., Round Rock, TX (US)

(72) Inventors: Shivakumar Sundaram, Tamilnadu (IN); Krishnamurthy Subramanian, Mountain View, CA (US); Pathangi Narasimhan Janardhanan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 403 days.

(21) Appl. No.: 13/716,478

(22) Filed: Dec. 17, 2012

(65) Prior Publication Data

US 2014/0169365 A1 Jun. 19, 2014

(51) Int. Cl.
*H04L 12/46* (2006.01)
*H04L 12/741* (2013.01)
*H04L 12/42* (2006.01)
*H04L 12/935* (2013.01)

(52) U.S. Cl.
CPC .............. *H04L 45/745* (2013.01); *H04L 12/42* (2013.01); *H04L 49/3009* (2013.01)

(58) Field of Classification Search
CPC .......... H04L 45/00; H04L 49/70; H04L 45/54
USPC ................... 370/392, 401, 389, 400
See application file for complete search history.

(56) References Cited

U.S. PATENT DOCUMENTS

| | | | | |
|---|---|---|---|---|
| 8,446,914 | B2 * | 5/2013 | Cheng et al. ................... | 370/401 |
| 8,615,015 | B1 * | 12/2013 | Shekhar ........................ | 370/400 |
| 8,989,186 | B2 * | 3/2015 | Koganti et al. ............... | 370/392 |
| 2005/0195812 | A1 * | 9/2005 | Wybenga et al. ............. | 370/389 |
| 2010/0284407 | A1 * | 11/2010 | Leelanivas et al. ........... | 370/392 |
| 2011/0299535 | A1 * | 12/2011 | Vobbilisetty et al. ......... | 370/392 |

* cited by examiner

*Primary Examiner* — Wei Zhao
*Assistant Examiner* — Sai Aung
(74) *Attorney, Agent, or Firm* — Haynes and Boone, LLP (57) ABSTRACT

An information handling system is provided. The information handling system includes a plurality of forwarding processors, the plurality of forwarding processors each including a memory having a forwarding host table and a forwarding route table. The information handling system also includes at least one switching device coupled to the plurality of forwarding processors, the at least one switching device including a memory having a destination module and port table, a switching device host table and a switching device route table, wherein the at least one switching device is configured to perform an extended lookup in at least one of the switching device host table and switching device route table based on values included in a fabric header of information routed to the switching device to determine a destination of the information. A method for extending lookup tables is also provided that adds lookup tables in a switching device.

21 Claims, 9 Drawing Sheets

| Host Table 602 | |
|---|---|
| Dest. | Egress |
| 1.1.1.6 | 1/2 |
| 1.1.1.7 | 1/3 |
| ... | ... |
| 2.1.1.6 | 3/1 |
| 2.1.1.7 | 3/1 |
| ... | ... |
| 1.1.1.1 | 1/0 |
| 1.1.1.2 | 1/1 |
| ... | ... |
| 2.1.1.1 | 2/0 |
| 2.1.1.5 | 2/0 |

| Route Table 604 | |
|---|---|
| Prefix | Egress |
| 1.1.1.0/24 | EXT |
| ... | ... |
| 2.1.1.0/24 | EXT |
| 3.3.3.0/24 | 3/0 |
| 4.4.1.0/24 | 4/0 |
| ... | ... |
| 10.1.1.0/24 | 2/0 |
| ... | ... |
| 20.1.1.0/24 | 5/0 |
| 30.3.3.0/24 | 3/0 |
| 4.4.0.0/16 | 6/0 |
| 1.1.1.0/24 | CPU |
| 0.0.0.0 | 0/0 |

SYSTEMS AND METHODS FOR ROUTING INFORMATION IN AN INFORMATION HANDLING SYSTEM USING EXTENDED L3 LOOKUP TABLES

BACKGROUND

1. Technical Field

The present disclosure is related to systems and methods for routing information in an information handling system. In particular, embodiments disclosed herein are related to systems and methods for extending L3 lookup tables and routing information using the extended L3 lookup tables.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems that perform routing functions rely on lookup tables for performing the routing functions. These lookup tables have a finite size that is generally determined by the size of the memory allocated for the tables. As a result, the number of entries, and possible forwarding destinations are limited by the size of these routing tables. What is needed is a system and method for extending the lookup routing tables and routing information using the extended lookup routing tables.

SUMMARY

Consistent with some embodiments, there is provided an information handling system. The information handling system includes a plurality of forwarding processors, the plurality of forwarding processors each including a memory having a forwarding host table and a forwarding route table. The information handling system also includes at least one switching device coupled to the plurality of forwarding processors, the at least one switching device including a memory having a destination module and port table, a switching device host table and a switching device route table, wherein the at least one switching device is configured to perform an extended lookup in at least one of the switching device host table and switching device route table based on values included in a fabric header of information routed to the switching device to determine a destination of the information.

Consistent with some embodiments, there is also provided a method of routing information in an information handling system having a plurality of forwarding processors and at least one switching device. The method includes forwarding information from at least one of the forwarding processors to the at least one switching device, performing a lookup in a destination module and port table stored in a memory of the at least one switching device to determine a destination module and port of the information, and performing an extended lookup in the switching device host table or the switching device route table on the information to determine a destination address and destination port of the information if the destination module and port of the information designate that the information is to be routed according to the extended lookup.

Consistent with some embodiments, there is also provided a non-transitory computer-readable medium having instructions for execution by one or more processors that, when executed, cause the one or more processors to perform a method for routing information in an information handling system having a plurality of forwarding processors and at least one switching device. The method includes forwarding information from at least one of the forwarding processors to the at least one switching device, performing a lookup in a destination module and port table stored in a memory of the at least one switching device to determine a destination module and port of the information, and performing an extended lookup in the switching device host table and switching device route table on the information to determine a destination address and destination port of the information if the destination module and port of the information designate that the information is to be routed according to the extended lookup.

Further consistent with some embodiments, there is also provided a method for extending lookup tables in a forwarding processor of an information handling system into a switching device of the information handling system. The method includes adding lookup tables in the switching device, the lookup tables in the switching device being logical extensions of lookup tables in the forwarding processor such that the lookup tables in the switching device and the lookup tables in the forwarding processor are viewed as at least one logical lookup table, designating a reserved entry value in the tables of the forwarding processor for indicating that a lookup will be performed in the lookup tables in the switching device on a packet routed to the switching device, and attaching a fabric header to the packet, the fabric header including routing information and the designated entry value.

These and other embodiments will be described in further detail below with respect to the following figures.

BRIEF DESCRIPTION OF THE DRAWINGS

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
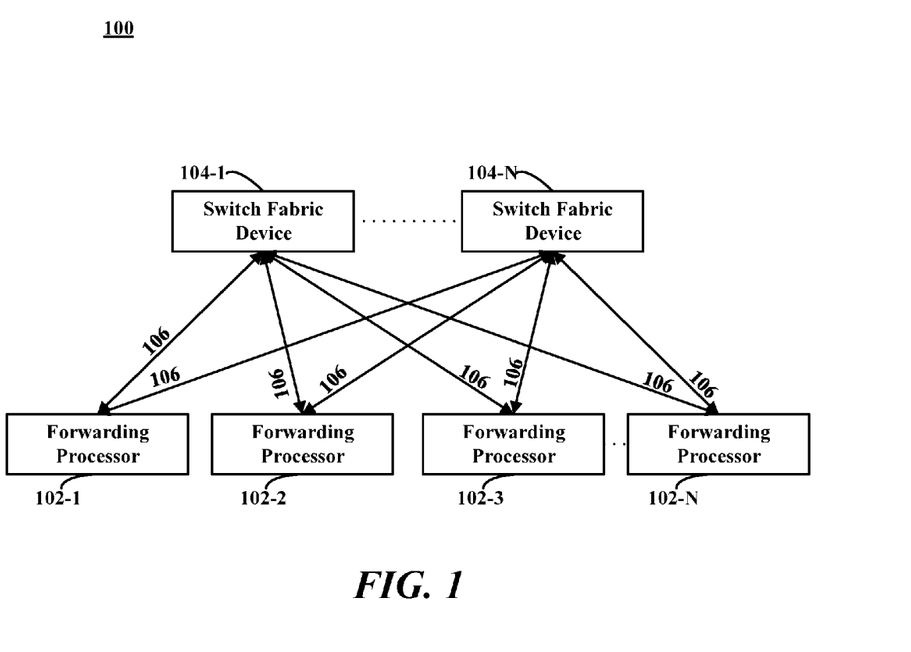
FIG. 1 shows an information handling system consistent with some embodiments.

FIG. 1 shows an information handling system consistent with some embodiments. As shown in FIG. 1, information handling system 100 includes a plurality of forwarding processors 102-1-102-N (collectively referred to as forwarding processors 102) coupled to each other in through switch fabric devices 104-1-104-N (collectively referred to as switch fabric devices 104) over switch fabric links 106. Forwarding processors 102-1-102-N may correspond to any processor that can forward ingress (received) information, such as data packets, by looking up a destination address in one or more forwarding tables, which provide the egress information including the egress module and port combination. When the egress module and port combination is located on another forwarding processor 102, the incoming forwarding processor may add a fabric header, that may be switch specific, to the information. The fabric header may include information such as a module and port information and information regarding the destination forwarding processor. Switch fabric devices 104-1-104-N may correspond to any processor that can act as a switch by routing information according to module destination and port destination information provided by forwarding processors 102-1-102-N. Consistent with some embodiments, forwarding processors 102-1-102-N and switch fabric devices 104-1-104-N may include any appropriate combination of hardware and/or software having a processor and capable of reading instructions stored on a non-transitory machine-readable medium for execution by forwarding processors 102-1-102-N or a processor associated with switch fabric devices 104-1-104-N. Consistent with some embodiments, forwarding processors 102-1-102-N and switch fabric devices 104-1-104-N include a machine-readable medium, such as a memory (not shown) that includes instructions for execution by a processor (not shown) for causing forwarding processors 102-1-102-N and switch fabric devices 104-1-104-N to perform specific tasks. For example, such instructions may include handling and routing information. In particular, forwarding processors 102-1-102-N and switch fabric units 104-1-104-N may be configured to route and forward data packets based on fabric headers within the data packets describing a destination of the data packets. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
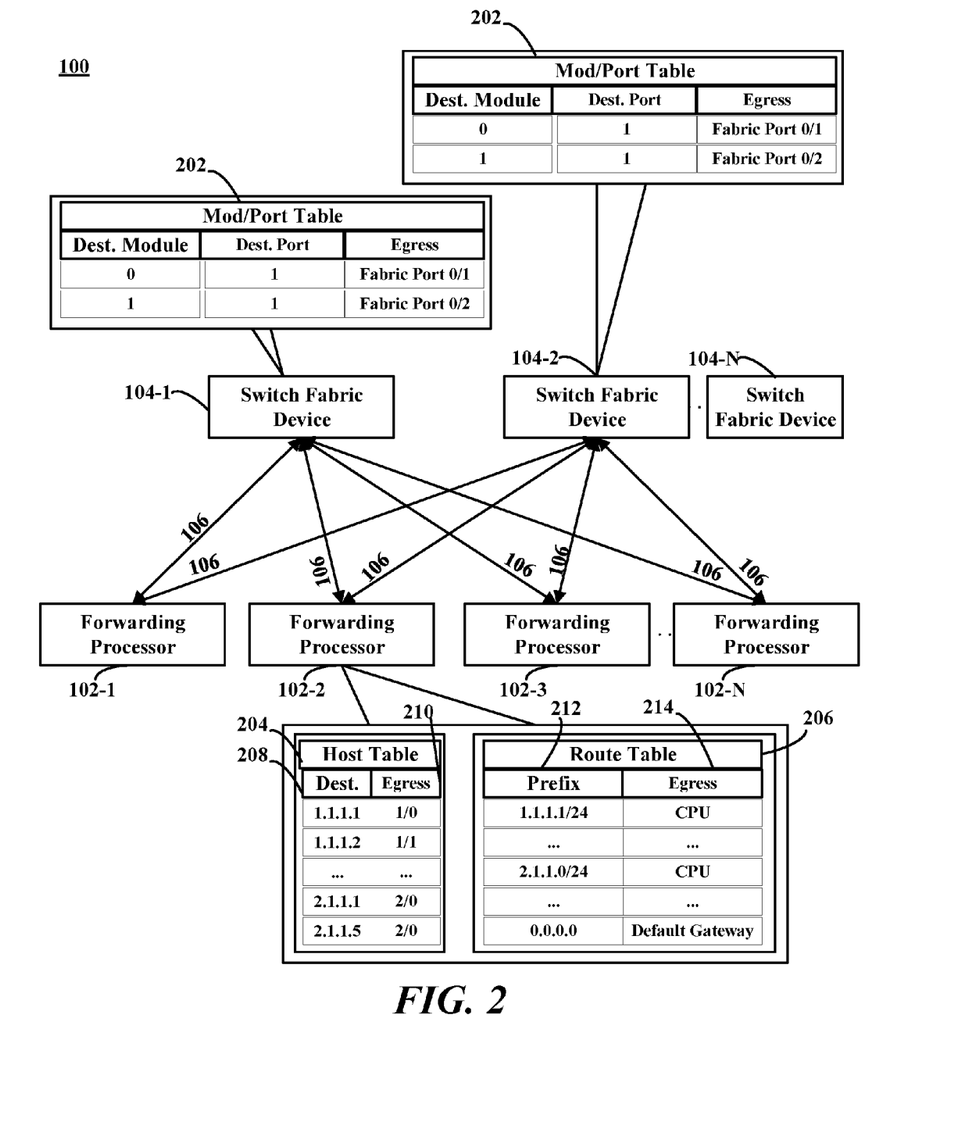
FIG. 2 is a diagram illustrating an example of an information handling system showing forwarding tables of selected forwarding processors and switch fabric devices, consistent with some embodiments.

FIG. 2 is a diagram illustrating an example of information handling system 100 showing forwarding tables of selected forwarding processors and switch fabric devices, consistent with some embodiments. As shown in FIG. 2, switch fabric devices 104 each include one or more forwarding tables such as module and port forwarding table 202. Forwarding processors 102 each include one or more forwarding tables such as a host table 204 and a route table 206. Although only switch fabric devices 104-1 and 104-2 are shown as including module and port forwarding table 202, each switch fabric device 104-N may include a module and port forwarding table such as module and port forwarding table 202. Similarly, each forwarding processor 102-1-1-2-N may include one or more forwarding tables such as host table 204 and route table 206.

Host table 204 includes entries for a destination internet protocol (IP) address 208 and an egress module and port combination 210. Consistent with some embodiments, a level 3 (L3) address resolution protocol (ARP) lookup may be performed in host table 204 to find an exact match for a destination IP address, wherein the information having the destination IP address will be routed according to an egress module and port combination that corresponds to the matching destination IP address. Route table 204 includes entries for a destination address prefix 212 and entries for egress handling 214. Consistent with some embodiments, an L3 longest prefix match (LPM) lookup may be performed in route table 206 to find an LPM of the destination address and then route the packet according to the lookup based on ARP resolution performed according to an entry corresponding to an LPM match of the destination address. The ARP resolution may be performed by a central processing unit (CPU). If no match is found, the information will be routed according to a default gateway that may be predetermined. In operation, when forwarding processor 102 receives information, a lookup may be performed in both host table 206 and route table 208. If an exact match is found in host table 206, the information will be forwarded according to the destination module and port combination corresponding to the matching destination address, and any matches in route table 208 will be ignored. If an exact match is not found in host table 206, the information will be forwarded according to a matching entry in route table 208.

Once a match has been found, the packet is either switched locally or, if it is required to forward the packet out of a port on another forwarding processor 102, transmitted through fabric links 106 to a corresponding switch fabric device 104, such as switch fabric device 104-1 or switch fabric device 104-2. Consistent with some embodiments, forwarding processor 102 may associate the packet being forwarded with a fabric header that includes information to be used by the receiving switch fabric device 104 for forwarding the packet to forwarding processor 102 having the correct port for forwarding. The information may include a unique module identifier for each forwarding processor 102 and a unique port identifier associated with the module identifier, and may also include additional information. When the packet having the fabric header is received by switch fabric device 104 a lookup based on the information in the fabric header is performed. That is, switch fabric device 104 will look up the unique module identifier in and unique port identifier in the fabric header of the packet, and forward the packet to forwarding processor 102 having the correct port for forwarding indicated by the matching module and port identifiers.

Figure 3:
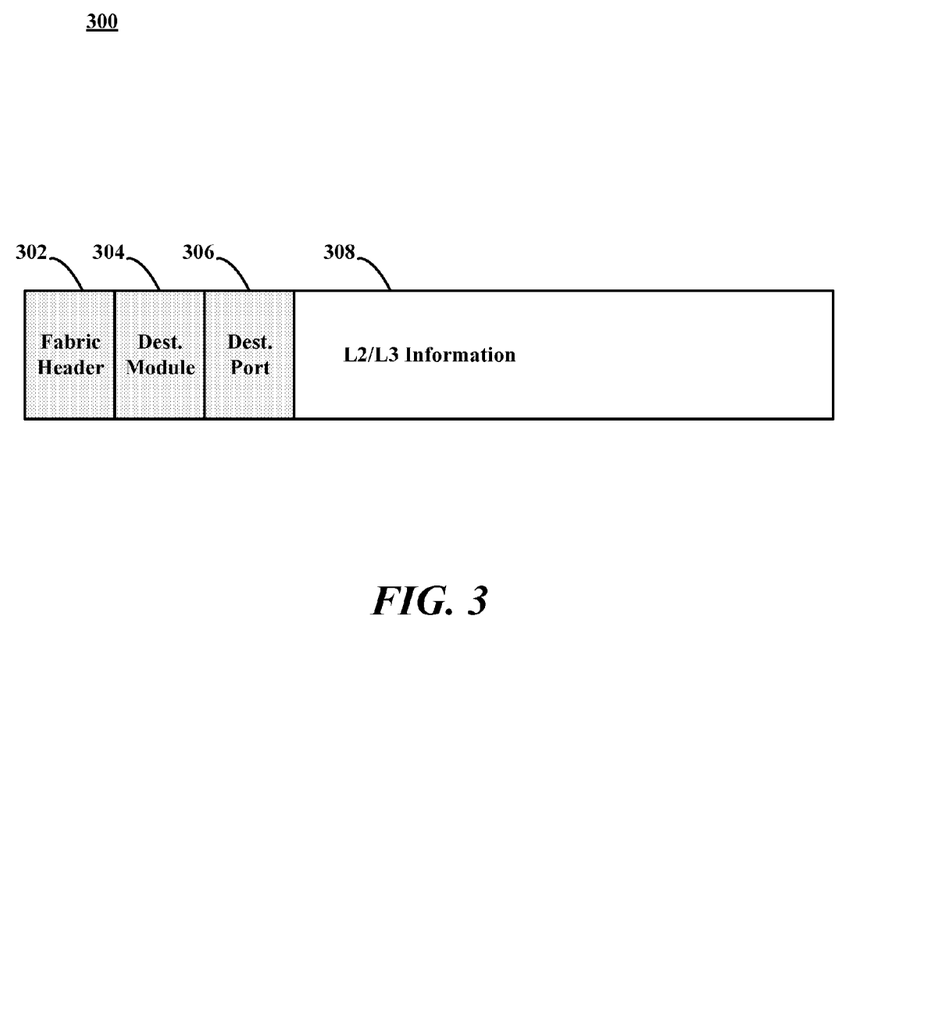
FIG. 3 is a diagram illustrating a packet that may be transmitted through fabric links in the system of FIG. 1, according to some embodiments.

FIG. 3 is a diagram illustrating a packet that may be transmitted through fabric links in the system of FIG. 1, according to some embodiments. As shown in FIG. 3, packet 300 includes a fabric header 302 having a destination module identifier 304, a destination port identifier 306, and level 2 and level 3 information 308 that may be part of the original packet received by forwarding processor 102. The additional level 2 and level 3 information may include such information as the destination address and the source address. Fabric header 302 having destination module 304, and destination port 306 are associated with packet 300 by forwarding processor 102 to be used by a receiving switch fabric device 104 for forwarding the packet to forwarding processor 102 having the correct port for forwarding. Consistent with some embodiments, switch fabric device 104 does not refer to the L2/L3 information 308 when forwarding the packet. It is typically ignored as the switch fabric device 104 is capable of forwarding the packet using just the information provided by forwarding processor 102 in the associated fabric header 302.

Figure 4:
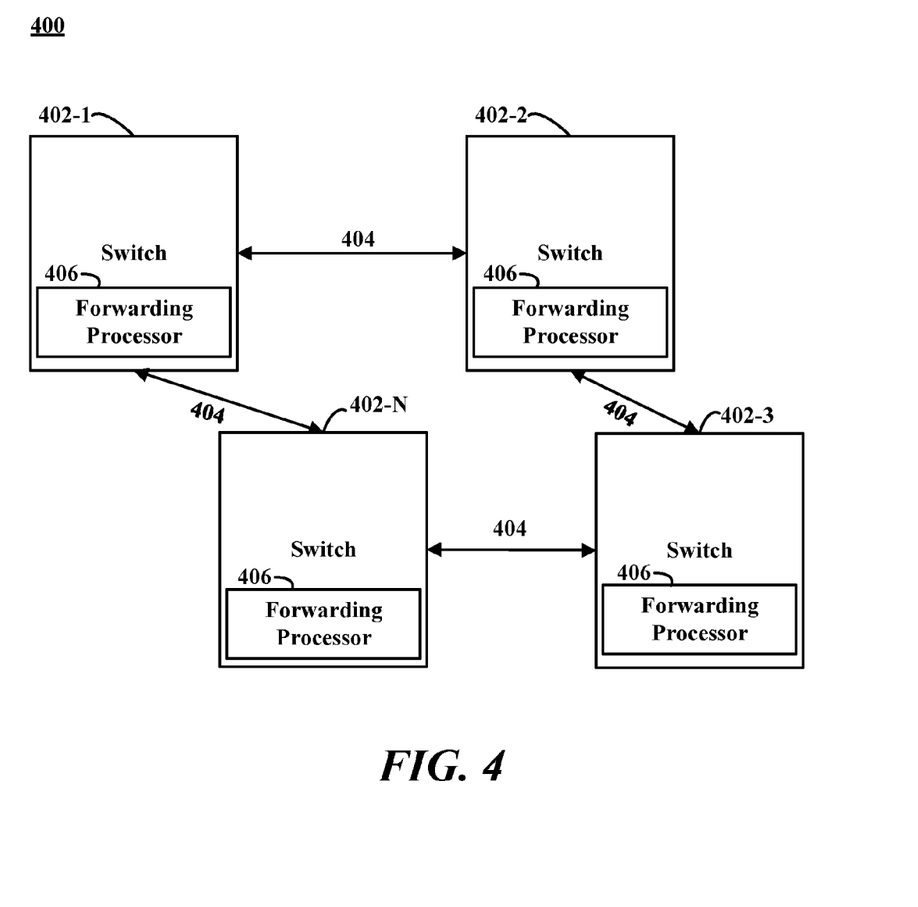
FIG. 4 is a diagram illustrating an information handling system coupled in a stacked arrangement, consistent with some embodiments.

FIG. 4 is a diagram illustrating an information handling system 400 coupled in a stacked arrangement, consistent with some embodiments. In a stacked information handling system, forwarding processors from each switching unit are coupled together in a ring or daisy chain or other arrangement using fabric links. As shown in FIG. 4, system 400 includes a plurality of switching devices or "switches" 402-1-402-N (collectively referred to as switch 402) coupled together in a ring topology by fabric links 404. Each switch 402 includes a forwarding processor 406 that includes one or more forwarding tables including a host table and a route table (not shown) similar to host table 204 and route table 206 in FIG. 2. In operation, stacked system 400 forwards packets similar to system 200 shown in FIG. 2. In particular, packets received by forwarding processor 406 in, for example, switch 402-1 would perform a lookup operation in the host table and route table of forwarding processor 406 and, if it is required to forward the packet out of a port on another forwarding processor 406, a fabric header is associated with the packet and it is transmitted through fabric links 404 to the next switch in the ring 402-2 or 402-N. Forwarding processor 406 in the next switch 402-2 or 402-N would perform also perform a lookup operation based on information included in the fabric header and locally forward or forward to the next switch 402-3 and so on, performing lookups based on information included in the associated fabric header until the proper egress port is reached. The fabric header may include information may include a unique module identifier for each forwarding processor 406 and a unique port identifier associated with the module identifier. The forwarded packet may be similar to packet 300 shown in FIG. 3. Consistent with some embodiments, forwarding processor 406 of switch 402 does not refer to the L2/L3 information of the packet when forwarding the packet. It is typically ignored as forwarding processor 406 of switch 402 is capable of forwarding the packet using just the information provided by forwarding processor 406 in the associated fabric header.

As described above, forwarding processors 102 and 406 in systems 100 and 400 are capable of forwarding received packets using one or more forwarding tables such as host table 204 and route table 206. However, host table 204 and route table 206 have a finite size that is generally determined by the size of the memory allocated for the tables. As a result, the number of entries, and possible forwarding destinations are limited by the size of host table 204 and route table 206.

Figure 5:
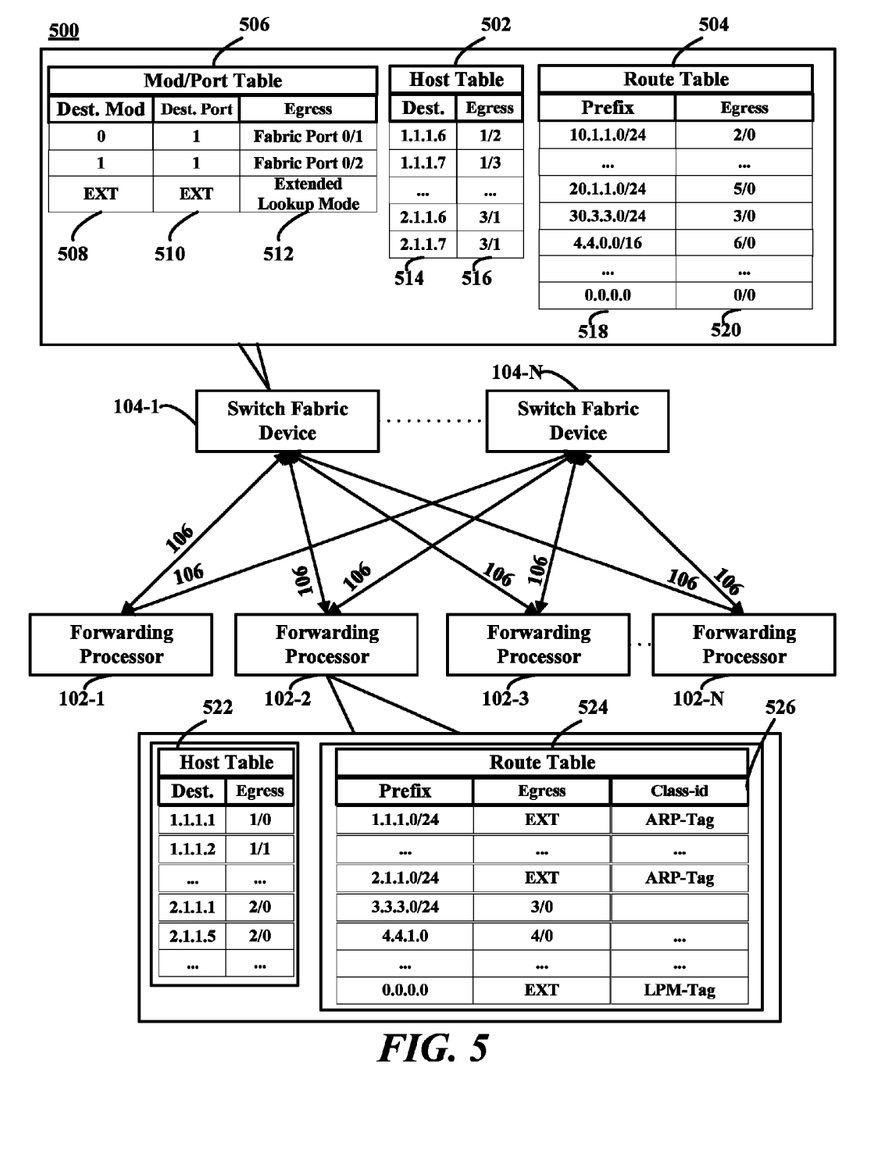
FIG. 5 is a diagram illustrating an information handling system having extended host and route tables, consistent with some embodiments.

FIG. 5 is a diagram illustrating an information handling system having extended host and route tables, consistent with some embodiments. As shown in FIG. 5, information handling system 500 is similar to information handling system 100, except that switch fabric device 104-1 includes a host table 502 and a route table 504 that is an extension to the host and route tables in forwarding processors 102. Switch fabric device 104-1 also includes a module and port forwarding table 506 that is similar to module and port forwarding table 202 shown in FIG. 2, except that module and port forwarding table 506 may be populated with destination module lookup values 508 and destination port lookup values 510, wherein a specific module and port value is reserved for providing an indication to switch fabric device 104-1 to perform an extended lookup. Switch fabric device 104-1 also includes lookup values for egress handling 512 that. As described in greater detail below, a packet received by switch fabric device 104-1 having a specific module and port value in its fabric header that corresponds to the module and port value reserved for providing an indication to perform an extended lookup will be further processed by performing lookups in host table 502 and route table 504. The specific module and port value can be any value, such as 1/0, 10/0, etc., and will be simply referred to as "EXT" herein. Although only switch fabric device 104-1 is shown as including host table 502, route table 504, and module and port forwarding table 506, switch fabric devices 104-N in information handling system 500 may also include host table 502, route table 504, and module and port forwarding table 506 in some embodiments.

As shown in FIG. 5, host table 502 includes lookup values for a destination IP address 514 of the packet, with the result of the lookup being an egress module and port combination value 516. Consistent with some embodiments, an L3 address resolution protocol (ARP) lookup may be performed in host table 502 to find an exact match for a destination IP address, wherein the information having the destination IP address will be routed according to an egress module and port combination lookup value that matches the destination IP address. Route table 504 includes lookup values for a destination address prefix 518 and lookup values for egress handling 520. Consistent with some embodiments, an L3 LPM lookup may be performed in route table 504 to find an LPM of the destination address and then route the packet according to the lookup.

Forwarding processor 102-2 includes a host table 522 and a route table 524. An L3 address resolution protocol (ARP) lookup may be performed in host table 522 to find an exact match for a destination IP address, wherein the information having the destination IP address will be routed according to an egress module and port combination that corresponds to the matching destination IP address. An L3 longest prefix match (LPM) lookup may be performed in route table 524 to find an LPM of the destination address and then route the packet according to the lookup. As shown in FIG. 5, the result of an LPM lookup in route table 524 may correspond to a specific module and port value that, when put into a fabric header associate with the packet, will designate that switch fabric device performs an extended lookup. In FIG. 5, the value is shown as "EXT". Consistent with some embodiments, and as described in greater detail below, the effective size of the L3 host and route tables used for performing ARP and LPM lookups can be increased by performing an extended lookup in switch fabric device 104. Although only forwarding processor 102-2 is shown as including host table 522 and route table 524, forwarding processors 102-1 and 102-3-102-N in information handling system 500 may also include host table 522 and route table 524 in some embodiments.

Consistent with some embodiments, when forwarding processor 102-2 receives information, such as a data packet, for forwarding, forwarding processor 102-2 performs a lookup in host table 522 for a matching egress module and port lookup value. An LPM lookup function may also be performed in route table 524. Based on the result of the lookups performed in host table 522 and route table 524, the packet will be forwarded. If the result of the lookup indicates that the packet is to be forwarded locally, the lookup value matching the destination address in the host table will indicate a local port. If it is required to forward the packet out of a port on another forwarding processor 102, the packet is transmitted through fabric links 106 to a corresponding switch fabric device 104, such as switch fabric device 104-1. Consistent with some embodiments, forwarding processor 102-2 may associate the packet being forwarded with a fabric header that includes information to be used by the receiving switch fabric device 104 for forwarding the packet to forwarding processor 102 having the correct port for forwarding. The information may include a unique module and port identifier or a reserved port and module value that will be processed by switch fabric device 104 to perform an extended lookup, as described further below. When the packet having the fabric header is received by switch fabric device 104-1 a lookup based on the information in the fabric header is performed. That is, switch fabric device 104-1 will perform a lookup using the unique module and port identifiers to find a matching destination module lookup value 508 and destination port lookup values 510, and forward the packet to forwarding processor 102 having on the basis of the lookup. However, if the fabric header includes a designated value that will be interpreted by switch fabric device as requiring an extended lookup, a lookup is performed in at least one of switch fabric device host table 502 and switch fabric device route table 504. Once a matching lookup value is found in switch fabric device 502 or switch fabric device route table 504, the packet is forwarded on through the egress port indicated by the lookup.

For performing an extended lookup in switch fabric device 104, switch fabric device may distinguish between packets requiring an extended lookup in switch fabric device host table 502 and packets requiring an extended lookup in switch fabric device route table 504 in order to properly handle such information packets when the lookup fails in switch fabric device 104. Consistent with some embodiments, if a lookup fails in switch fabric device host table 502 a central processing unit (CPU) may be needed to perform ARP resolution. Moreover, if a lookup fails in switch fabric device route table 504 a default route may designated for routing. To assist switch fabric device 104 with such situations, forwarding processor 102 forwarding the information packet may place an additional value in the fabric header designating a reserved internal priority to attempt to perform ARP resolution by the CPU if a lookup fails in switch device host table 502. Alternatively, classification identification value 526 may be included in the fabric header that designates whether the information packet requires an extended lookup in switch fabric device host table 502 or an extended lookup in switch fabric device route table 504, wherein switch fabric device 104 may be configured to automatically redirect information packets having the ARP-Tag to a central processing unit for routing if a lookup fails in switch fabric device host table 502 and automatically reroute information packets having a LPM-Tag to a default route if a lookup fails in switch fabric device route table 504. Further, information packets may also be given an indication in the fabric header to not decrement a time-to-live (TTL) counter for each of the rerouted information packets.

A similar approach may be used to route information packets by performing an extended lookup in a switching device in stacked information handling systems, such as system 400 shown in FIG. 4. For example, if a stacked system utilizes a hub and spoke arrangement (not shown) the hubs may be configured to act as switch fabric devices and perform host table and route table lookups. In a stacked system having a ring topology, such as system 400, forwarding processor 406 of each switch 402 may include an extended port for extended lookups for packets received from a neighboring switch 402. Moreover, each forwarding processor 406 may have a specific unique indication for its extended port so that information packets transmitted between switches 402 can designate the particular forwarding processor 402 in which to perform an extended lookup. This information will be included in the fabric header associated with the information packet by the ingress forwarding processor.

System 500 may also be used with virtual routing and forwarding (VRF) and policy-based routing (PBR). VRF allows multiple instances of a routing table to coexist within the same routing device at the same device. However, since VRF information would not be included in a header of the information packet being transmitted to switch fabric devices 104, VRF could be implemented by extending a table size of only one VRF, writing the routes for other VRF's only in host tables 524 while writing routes for the extended VRF table on tables 522 and 524 on forwarding processor and in module and port table 506 in switch fabric device 506.

PBR is used to make routing decisions set by the network administrator to forward information based on other criteria such as source/destination address, size of a packet, and the protocol of the payload. PBR is typically implemented using access control lists (ACL) tables which can override the result of lookups performed in table 522. As a result, implementing PBR routes on ingress forwarding processors 102 allows PBR to be implemented as long as PBR ACL rules do not depend on the results of lookups performed in host table 522 or route table 524. If the PBR route table size needs to be extended for performing extended lookups, it can be extended in switch fabric device by having an ACL entry at the bottom of the PBR table to redirect all packets to the reserved module and port entry in module and port table 506 that corresponds to an extended lookup on switch fabric processor 104.

Figure 6:
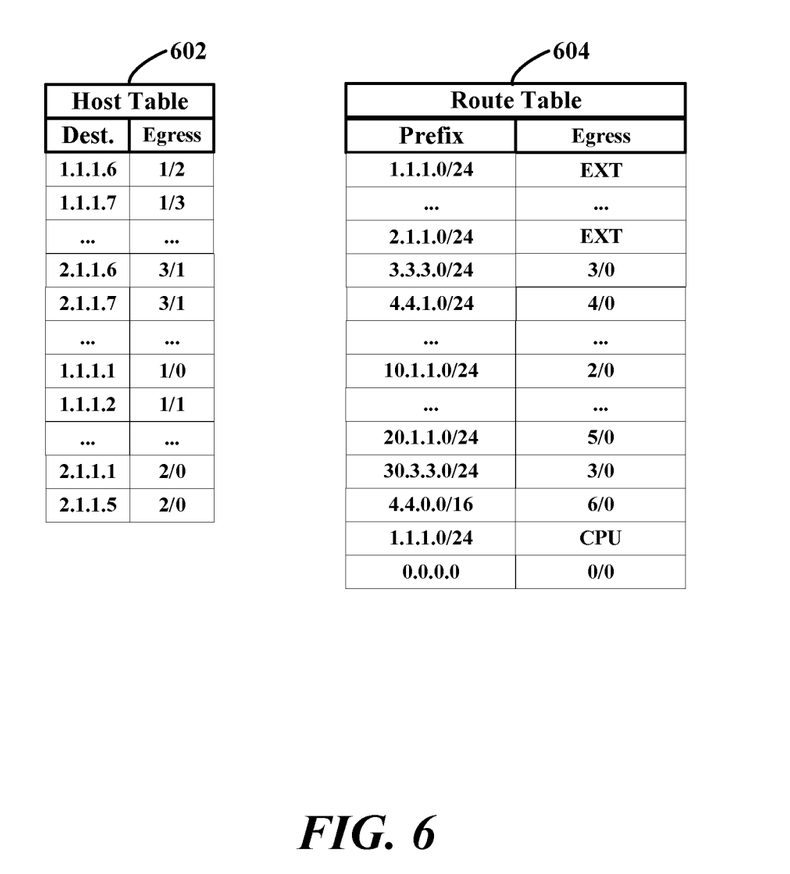
FIG. 6 is a diagram illustrating a logical view of host tables and route tables as single host and route tables, consistent with some embodiments.

FIG. 6 is a diagram illustrating a logical view of host tables 502 and 522 and route tables 504 and 524 as single host and route tables, consistent with some embodiments. As shown in FIG. 6, host tables 502 and 522 and route tables 504 and 524 may be logically viewed as a single extended host table 602 and a single extended route table 604. Consistent with some embodiments, extended host table 602 may be organized such that the top half of extended host table 602 may include entries from host table 522 from forwarding processor 102 and the bottom half of extended host table 602 may include entries from host table 502 from switch fabric device 104. Extended table 604 may be similarly arranged. In accordance with some embodiments, host tables 522 and 502 that form extended host table 602 may be L3 ARP tables wherein an exact match lookup is performed, so entries can be added or removed from extended table 602 without requiring any reorganization of entries in extended table 602. However, extended route table 604, which may perform LPM lookups, may organize extended table 604 such that longer and more specific route prefixes are placed higher in extended table 604 above more generic and less specific route prefixes. For example, if a new route prefix entry needs to be added to extended table 604, extended table 604 will be organized such that the new route prefix entry will be placed in extended table 604 based on the specificity of the route prefix, even if it results in reorganization of route entries across extended table 604. Consistent with some embodiments, one or more processors in switch fabric device 104 and/or forwarding processor may execute a control plan module for installing routes may determine if new route needs to be added in extended table 604 and where it should be inserted within extended table 604 by maintaining an ordered route table list that may be sorted based on the prefix length from the longest to shortest route prefix. Consequently, a shorter route prefix may be entered in the route table list and extended table 604 below a longer route prefix entry and above a shorter route prefix entry.

Consistent with some embodiments, route prefix entries for directly connected subnets are in route table 524 primarily to redirect packets whose host table 522 entries are not yet resolved. In extended table 604, the directly connected subnet route prefix entries should remain in route table 524, even if extended table 604 is reorganized based on a new entry, so that packets are redirected first to the route table 504 in switch fabric device 104 to check if a resolution exists. If a resolution exists, the packets would be redirected based on the lookup entry. If a resolution is not in route table 504, the packet will be redirected to a processor to for resolution. Consistent with some embodiments the default gateway entry of 0.0.0.0 in route tables 504 and 524, and logically seen in extended table 604, is used for forwarding packets belonging to unknown destination subnets to a designated default port. In extended table 604, the default gateway forwarding may be performed done through the usage of one or more rules, as discussed above.

Figure 7A:
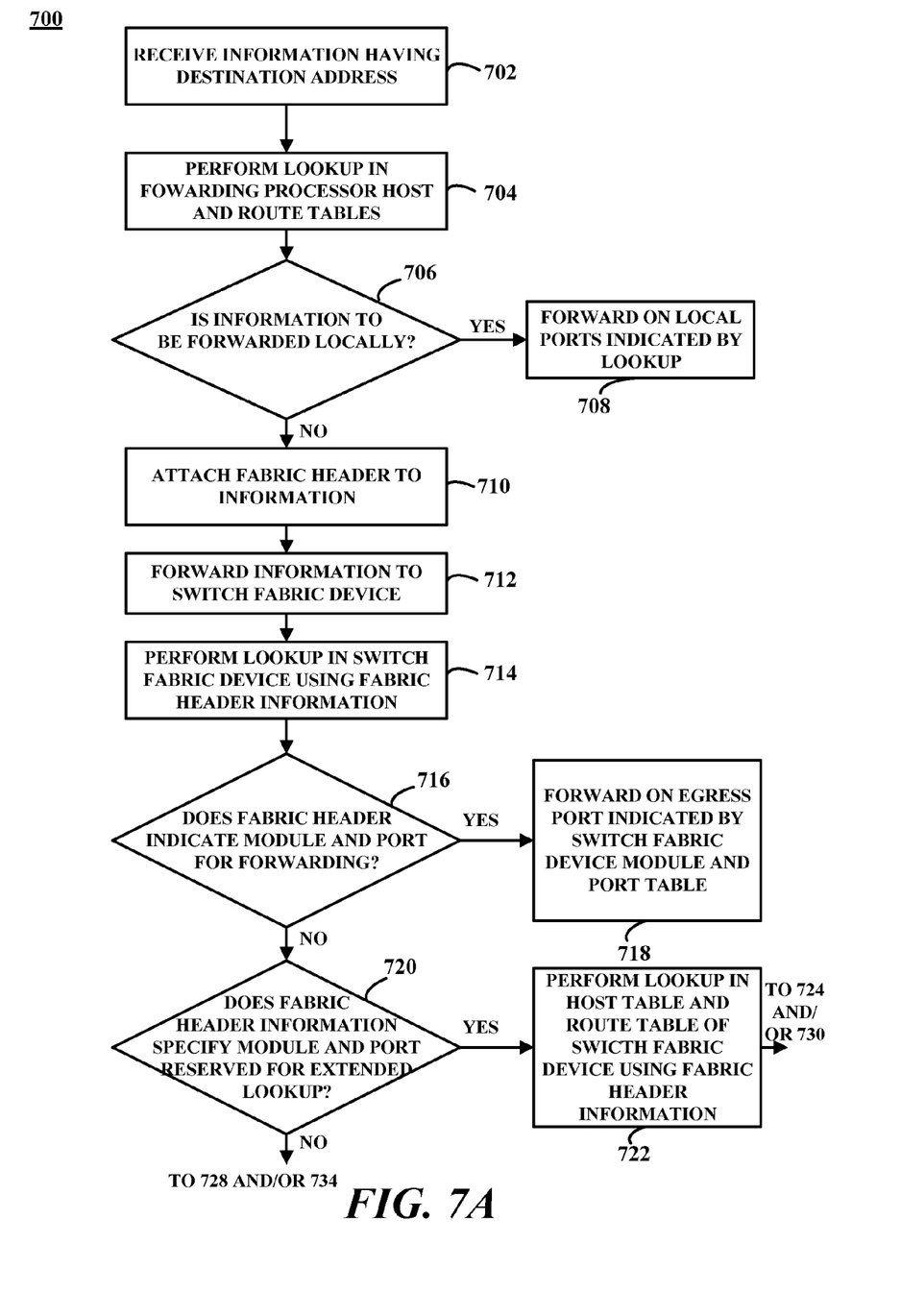
FIGS. 7A and 7B correspond to flowcharts illustrating a method of routing information packets received in an information handling system, consistent with some embodiments.
Figure 7B:
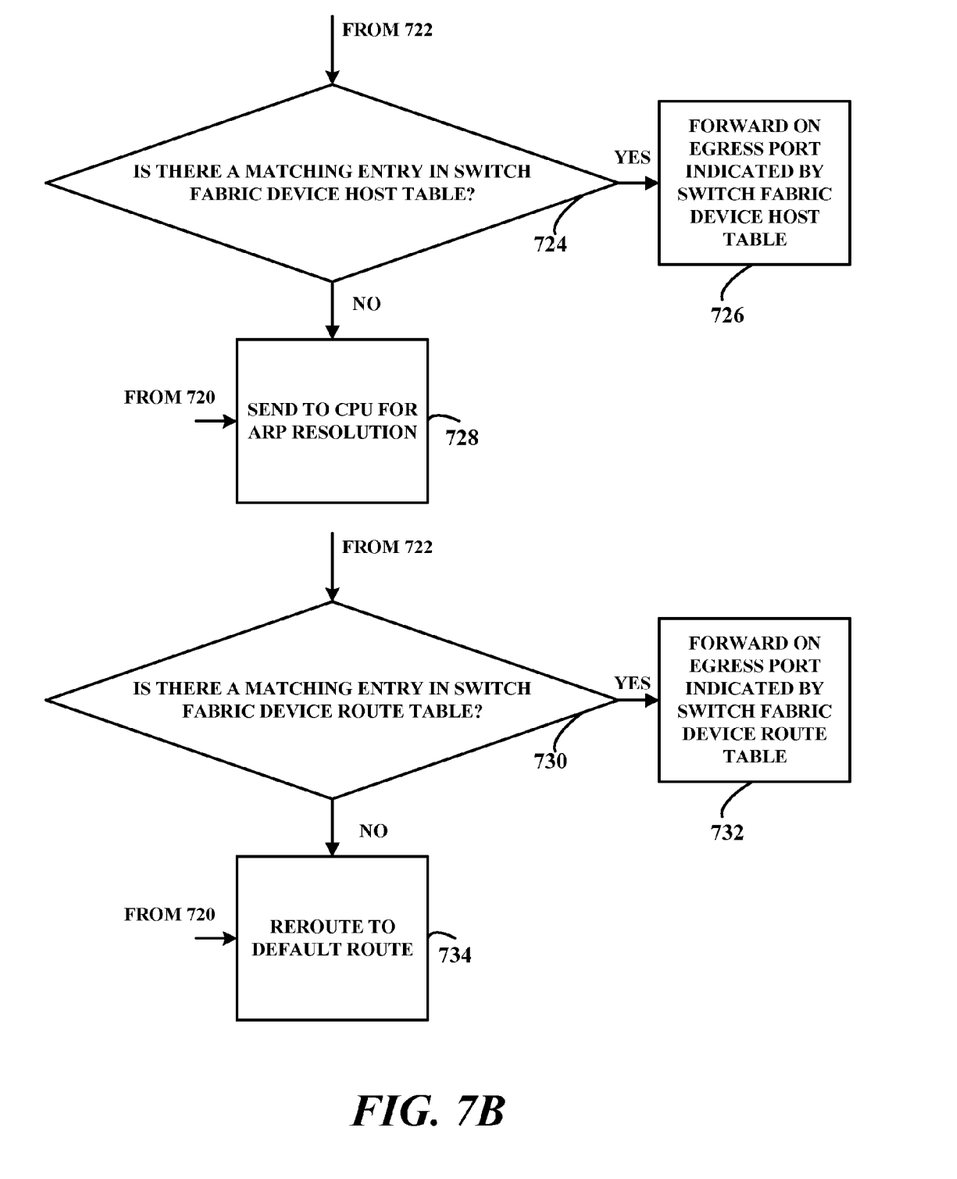

FIGS. 7A and 7B correspond to flowcharts illustrating a method of routing information packets received in an information handling system, consistent with some embodiments. For the purpose of illustration, FIGS. 7A and 7B will be described with reference to FIGS. 5 and 6. Method 700 may be embodied in computer-readable instructions for execution by one or more processors in information system 100, including forwarding processors 102 and switch fabric devices 104, such that the steps of method 700 are performed by information handling system 500. As shown in FIG. 7A, method 700 begins when information handling system 500 receives information having a destination address (702). Consistent with some embodiments, the information may be a data packet such as packet 300, and may be an ingress packet received by forwarding processor 102. A lookup is then performed in host table 522 and route table 524 of forwarding processor 102 (704). A determination is made based on the lookup if the information is to be locally forwarded (706). If the information is to be forwarded locally on a port of specific forwarding processor 102 that receives the information, the forwarding occurs locally (708). Forwarding processor 102 will attach a fabric header to the information (710). Consistent with some embodiments, the attached fabric header may include routing information and a specific module and port for forwarding. The information is forwarded to switch fabric device 104 (712) and a lookup is performed in switch fabric device using the attached fabric header information (714). A determination is made by switch fabric device 104 as to whether the fabric header information specifies a module and port for forwarding (716). If the fabric header information specifies a module and port for forwarding, the information is forwarded to another forwarding processor 102 on the egress port indicated in module port table 506 based on the lookup (718). If no specific module and port is indicated for forwarding, that is, if a matching entry is not found by the lookup that indicates an egress port on which to forward, a determination is made as to whether the fabric header information specifies a module and port that is reserved for indicating that an extended lookup is to be performed (720). If the fabric header information specifies the module and port information that is reserved for indicating that an extended lookup is to be performed, a lookup is performed in host table 502 and route table 504 of switch fabric device 104 (722). Consistent with some embodiments, host table 502 and route table 504 may be viewed as entries in a logical extended host table 602 and logical extended route table 604, as described above. As shown in FIG. 6B, a lookup may be performed in switch fabric device host table 502 to determine if there is a matching entry (724). If a match is found, switch fabric device 104 forwards the information according to the egress port entry indicated in switch fabric device host table 502 based on the lookup (726). If no match is found, the packet will be sent to a central processing unit for ARP resolution (728). Switch fabric device 104 may also perform an extended lookup in switch fabric device route table 504 to determine if there is a matching entry in switch fabric device route table 504 (730). If a match is found, the packet is then forwarded forwards the information according to the egress port entry indicated in switch fabric device route table 504 based on the lookup (732). If no match is found, the packet will be rerouted according to a default route, such as 0.0.0.0 (734). Moreover, if the lookup performed in steps 716 and 722 do not match any entry in module and port table 506 of switch fabric device 104, including the reserved value indicating an extended lookup, switch fabric device may perform ARP resolution (728) or reroute to a default route (734).

Consistent with some embodiments, extended logical tables 602 and 604, which may be used to route packets as described herein may be extended to systems having multiple switch fabric devices 104 each with extended L3 tables. For example, each switch fabric device 104 may be designated for extending a subset of directly connected subnets, such that entries in a forwarding processor host table for subnet 1.0.0.0/8 could go to one switch fabric device while host table entries for another subnet 2.0.0.0/8 could go to a different switch fabric device. Forwarding processors 102 would need to use different designated module and port values for each different switch fabric device to indicate extended lookups on a specific switch fabric device. Moreover, each switch fabric device may be designated to hold route prefix entries that are contained within an aggregatable generic prefix. In this example, forwarding processors 102 would need to match and redirect the appropriate aggregate prefix to different switch fabric processors using different designated module and port values for each different switch fabric device to indicate an extended lookup on a specific switch fabric device. According to one example, a forwarding processor 102 may have a route table 524 entry wherein prefix entry 100.0.0.0/6 is redirected to one switch fabric processor implying all route prefixes in which the upper 6 bits of the destination IP address match the value "011001" in binary would be redirected to that switch fabric processor. Similarly, a different aggregate prefix of 160.0.0.0/4 in which the upper 4 bits of a destination IP address matches a binary value of "1010" could be used for redirecting to another switch fabric processor.

Figure 8:
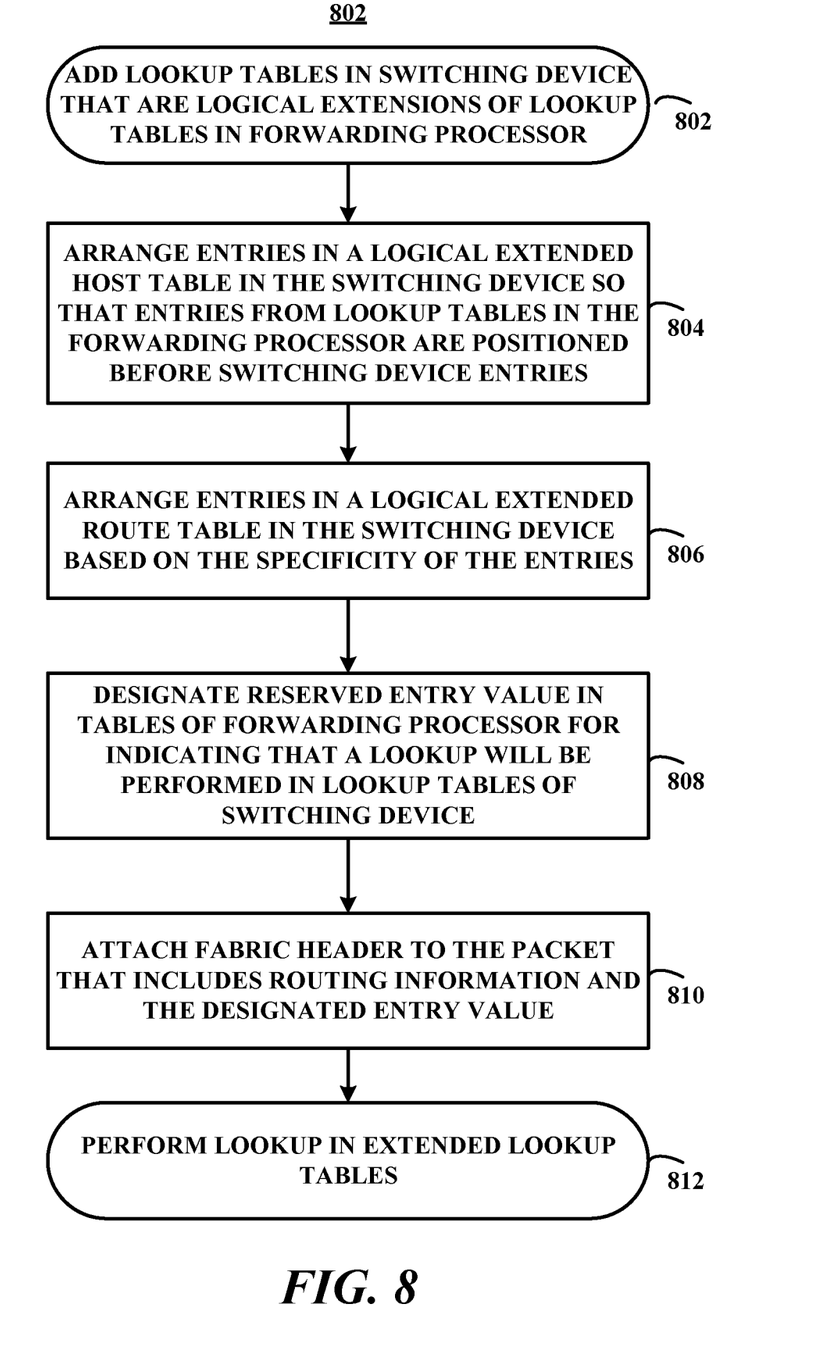
FIG. 8 is a flowchart illustrating a method for extending lookup tables in an information handling system, consistent with some embodiments.

FIG. 8 is a flowchart illustrating a method for extending lookup tables in an information handling system, consistent with some embodiments. For the purpose of illustration, FIG. 8 will be described with reference to FIGS. 5 and 6. Method 800 may be embodied in computer-readable instructions for execution by one or more processors in information system 100, including forwarding processors 102 and switch fabric devices 104, such that the steps of method 800 are performed by information handling system 500. As shown in FIG. 8, method 800 begins by adding lookup tables in switch fabric device 104 that are logical extensions of lookup tables in forwarding processor 102 (802). Consistent with some embodiments, switch fabric device host table 502 and route table 504 may be added as logical extensions to forwarding processor host table 522 and route table 524, producing extended host table 602 and extended host table 604. Consistent with some embodiments, the entries in extended host table 602 are then arranged so that entries from forwarding processor host table 522 are positioned before entries from switch fabric device route table 502 (804). Further, entries in extended route table 604 are arranged based on the specificity of the entries such that more specific entries are placed before less specific entries (806). An entry value is reserved in host and route tables 522 and 524 of forwarding processor 102 that designates that an extended lookup is to be performed (808). When an egress packet is routed to forwarding processor, a lookup is performed in host and route tables 522 and 524 of forwarding processor 102, and if the lookup does not indicate that the packet is to be forwarded locally, a fabric header is attached to the packet that includes routing information and a specific module and port combination, which may correspond to the designated entry value that is reserved for performing an extended lookup (810). The packet may then be forwarded to switch fabric device 104, wherein if the specific module port combination corresponds to the designated entry values that is reserved performing an extended lookup, the lookup is performed in switch fabric device host and route tables 502 and 504, which are logical extensions of forwarding processor 102 host and route tables 522 and 524 arranged as extended host table 602 and extended route table 604 (812).

Consistent with embodiments described herein, there is provided systems and methods that for routing information in an information handling system using extended routing tables. In particular, the systems and methods described herein may effectively double the size of routing tables available for use in routing information. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
 a plurality of forwarding processors, the plurality of forwarding processors each including a memory having a forwarding host table and a forwarding route table;
 at least one switching device coupled to the plurality of forwarding processors, the at least one switching device including a memory having a destination module and port table, a switching device host table and a switching device route table, wherein
 the at least one switching device is configured to perform an extended lookup in at least one of the switching device host table and switching device route table based on values included in a fabric header of information routed to the switching device to determine a destination of the information;
 wherein:
  the switching device route table is arranged so that entries are positioned based on their specificity, with more specific entries being positioned in the switching device route table before less specific entries; and
  the switching device route table comprises a default entry for routing the information if no match is found in the switching device route table or the switching device host table, the default entry being arranged as a last entry in the switching device route table.

2. The information handling system of claim 1, wherein the switching device host table comprises a level 3 (L3) address resolution protocol (ARP) table.

3. The information handling system of claim 1, wherein the switching device route table comprises a longest prefix match (LPM) table.

4. The information handling system of claim 1, wherein the values in the fabric header of the information routed to switching device includes a reserved value indicating that an extended lookup is to be performed in at least one of the switching device host table and the switching device route table.

5. The information handling system of claim 4, wherein the information routed to switching device is from one of the plurality of forwarding processors and the destination of the information indicates another of the plurality of forwarding processors.

6. The information handling system of claim 5, wherein the fabric header is associated with the information from an ingress forwarding processors of the plurality of forwarding processors.

7. The information handling system of claim 4, wherein the reserved value corresponds to a unique destination module and port pair.

8. The information handling system of claim 1, wherein the switching device comprises a plurality of network switches, each of the plurality of forwarding processors are in one of the plurality of network switches, and the plurality of network switches are coupled to one another.

9. The information handling system of claim 8, wherein the values correspond to a specific destination module and destination port value that indicates that an extended lookup is to be performed in a particular network switch.

10. The information handling system of claim 1, wherein the switching device comprises a switch fabric device.

11. A method of routing information in an information handling system having a plurality of forwarding processors and at least one switching device, comprising:
 forwarding information from at least one of the forwarding processors to the at least one switching device;
 performing a lookup in a destination module and port table stored in a memory of the at least one switching device to determine a destination module and port of the information; and
 performing an extended lookup in the switching device host table or the switching device route table on the information to determine a destination address and destination port of the information if the destination module and port of the information designate that the information is to be routed according to the extended lookup;

wherein:

the switching device route table is arranged so that entries are positioned based on their specificity, with more specific entries being positioned in the switching device route table before less specific entries; and the switching device route table comprises a default entry for routing the information if no match is found in the switching device route table or the switching device host table, the default entry being arranged as a last entry in the switching device route table.

12. The method of claim 11, wherein performing an extended lookup in the switching device host table and the switching device route table comprises:

performing a level 3 (L3) address resolution protocol (ARP) lookup on the information in the switching device host table; and performing a longest prefix match (LPM) lookup on the information in the switching device route table.

13. The method of claim 11, wherein forwarding information from at least one of the forwarding processors to the at least one switching device comprises:

affixing a header to the information designating the destination module and port of the information to be routed according to the extended lookup, the header including a designation as to whether an extended lookup will be performed on the information in the switching device host table or the switching device route table.

14. The method of claim 11, wherein the switching device comprises a plurality of network switches, each of the plurality of forwarding processors are in one of the plurality of network switches, and the plurality of network switches are coupled to one another.

15. A non-transitory computer-readable medium having instructions for execution by one or more processors that, when executed, cause the one or more processors to perform a method for routing information in an information handling system having a plurality of forwarding processors and at least one switching device, comprising:

forwarding information from at least one of the forwarding processors to the at least one switching device;

performing a lookup in a destination module and port table stored in a memory of the at least one switching device to determine a destination module and port of the information; and performing an extended lookup in the switching device host table and switching device route table on the information to determine a destination address and destination port of the information if the destination module and port of the information designate that the information is to be routed according to the extended lookup;

wherein:

the switching device route table is arranged so that entries are positioned based on their specificity, with more specific entries being positioned in the switching device route table before less specific entries; and the switching device route table comprises a default entry for routing the information if no match is found in the switching device route table or the switching device host table, the default entry being arranged as a last entry in the switching device route table.

16. The method of claim 15, wherein performing an extended lookup in the switching device host table and the switching device route table comprises:

performing a level 3 (L3) address resolution protocol (ARP) lookup on the information in the switching device host table; and performing a longest prefix match (LPM) lookup on the information in the switching device route table.

17. The method of claim 15, wherein forwarding information from at least one of the forwarding processors to the at least one switching device comprises:

affixing a header to the information designating the destination module and port of the information to be routed according to the extended lookup the header including a designation as to whether an extended lookup will be performed on the information in the switching device host table or the switching device route table.

18. The method of claim 15, wherein the switching device comprises a plurality of network switches, each of the plurality of forwarding processors are in one of the plurality of network switches, and the plurality of network switches are coupled to one another.

19. A method for extending lookup tables in a forwarding processor of an information handling system into a switching device of the information handling system, comprising:

adding lookup tables in the switching device, the lookup tables in the switching device being logical extensions of lookup tables in the forwarding processor such that the lookup tables in the switching device and the lookup tables in the forwarding processor are viewed as at least one logical lookup table;

designating a reserved entry value in the tables of the forwarding processor for indicating that a lookup will be performed in the lookup tables in the switching device on a packet routed to the switching device; and attaching a fabric header to the packet, the fabric header including routing information and the designated entry value;

wherein:

the at least one logical lookup table comprises a logical extended host table and a logical extended route table;

the logical extended route table is arranged so that entries are positioned based on their specificity, with more specific entries being positioned in the logical extended route table before less specific entries; and the logical extended route table comprises a default entry for routing the packet if no match is found in the logical extended route table or the logical extended host table, the default entry being arranged as a last entry in the logical extended route table.

20. The method of claim 19, further comprising:

arranging entries in the logical extended host table so that entries from lookup tables in the forwarding processor are positioned in the logical extended host table before entries from lookup tables in the switching device.

21. The method of claim 19, wherein the logical extended host table comprises an address resolution protocol (ARP) lookup table and the logical extended route table comprises an longest prefix match (LPM) lookup table.

* * * * *